United States Patent [19]

Gotoh et al.

[11] Patent Number: 5,286,781
[45] Date of Patent: Feb. 15, 1994

[54] PRESSURE SENSITIVE ADHESIVE COMPOSITION AND PRESSURE SENSITIVE ADHESIVE TAPE OR SHEET MAKING USE OF THE SAME

[75] Inventors: Masahiko Gotoh, Hasuda; Shigehisa Kobayashi, Kazo; Kazuhiro Kawabata, Tokyo, all of Japan

[73] Assignee: Sekisui Chemical Co., Ltd., Osaka, Japan

[21] Appl. No.: 868,166

[22] Filed: Apr. 14, 1992

[30] Foreign Application Priority Data

| Apr. 18, 1991 | [JP] | Japan | 3-86739 |
| Sep. 4, 1991 | [JP] | Japan | 3-224150 |
| Nov. 18, 1991 | [JP] | Japan | 3-302060 |
| Jan. 29, 1992 | [JP] | Japan | 4-13949 |

[51] Int. Cl.$^5$ ............................................. C09J 153/02
[52] U.S. Cl. .................................... 524/505; 524/271
[58] Field of Search ................ 524/505, 271; 525/92, 525/98

[56] References Cited

U.S. PATENT DOCUMENTS

| 3,686,107 | 8/1972 | Russell | 524/505 |
| 4,663,220 | 5/1987 | Wisneski et al. | 428/221 |
| 4,789,699 | 12/1988 | Kieffer et al. | 524/271 |
| 4,918,130 | 4/1990 | Kano et al. | 524/505 |
| 4,994,508 | 2/1991 | Shiraki et al. | 524/14 |

FOREIGN PATENT DOCUMENTS 58-13594 3/1983 Japan.
1-129085 5/1989 Japan.

OTHER PUBLICATIONS

*Handbook of Adhesives*, 3rd Ed., Edited by Irving Skeist, Van Nostrand Reinhold, New York, 1989, pp. 239-252.
Japanese Industrial Standards for Testing Methods of Pressure Sensitive Adhesive Tapes and Sheets, JIS Z 0237-8.

*Primary Examiner*—Bernard Lipman
*Assistant Examiner*—R. H. Delmendo
*Attorney, Agent, or Firm*—Lowe, Price, LeBlanc & Becker

[57] ABSTRACT

Disclosed herein is a pressure sensitive adhesive composition comprising 100 parts by weight of at least one block copolymer selected from the group consisting of block copolymers represented by the general formula A-B-A and block copolymers represented by the general formula A-B, wherein A means a styrene polymer block and B denotes a butadiene polymer block, an isoprene polymer block or a polymer block obtained by hydrogenating these polymers, 100-200 parts by weight of a tackifying resin and 25-200 parts by weight of a polyolefin. Pressure sensitive adhesive tapes or sheets comprising, as a pressure sensitive adhesive layer, the pressure sensitive adhesive composition are also disclosed.

6 Claims, No Drawings

PRESSURE SENSITIVE ADHESIVE COMPOSITION AND PRESSURE SENSITIVE ADHESIVE TAPE OR SHEET MAKING USE OF THE SAME

FIELD OF THE INVENTION

The present invention relates to a pressure sensitive adhesive composition, and more specifically to a pressure sensitive adhesive composition, which can provide rolled pressure sensitive adhesive tapes or sheets by using it, said tapes or sheets exhibiting good removability, having good unwinding ability, i.e., rerolling ability even when making no use of any release agents, retaining good peel adhesion over a long period of time, and permitting the peeling with smaller force at high-speed releasing than at low-speed releasing. It is also concerned with pressure sensitive adhesive tapes or sheets obtained by using such a pressure sensitive adhesive composition. The pressure sensitive adhesive tapes or sheets according to this invention are suitable for use as pressure sensitive adhesive tapes or sheets for surface-protecting, i.e., surface protective films.

BACKGROUND OF THE INVENTION

A block copolymer represented by the general formula A-B-A, wherein A means a styrene polymer block and B denotes a butadiene polymer block, an isoprene polymer block or a polymer block obtained by hydrogenating these polymers, is known to be a thermoplastic elastomer suitable for use as a pressure sensitive adhesive (see, for example, Handbook of Pressure Sensitive Adhesive Technology, the second edition, 1989, pp. 317–373).

Japanese Patent Publication No. 13594/1983 discloses a pressure sensitive adhesive composition of a pressure-sensitive hot-melt type, which comprises 100 parts by weight of a block copolymer represented by the general formula A-B-A, wherein A and B have individually the same meaning as defined above, 50–200 parts by weight of a tackifying resin (i.e., tackifer), 10–100 parts by weight of an extender oil, 5–35 parts by weight of low-molecular weight polyethylene and 1–20 parts by weight of low-density polyethylene or medium-density polyethylene. This pressure sensitive adhesive composition is described as being a pressure sensitive adhesive far excellent in heat resistance and good in electrical properties.

Japanese Patent Application laid-Open No. 129085/1989 discloses a surface protective film making use of a pressure sensitive adhesive, which comprises a block copolymer represented by the general formula A-B-A, wherein A and B have individually the same meaning as defined above, a tackifying resin and polyethyleneimine in which a higher alkyl group has been introduced.

Pressure sensitive adhesive tapes or sheets comprise a base material and a pressure sensitive adhesive layer formed thereon. These tapes or sheets are generally wound up in the form of a coil with the pressure sensitive adhesive layer inside to form rolls. In these rolls, the pressure sensitive adhesive layer as an upper layer closely adheres to the back surface of the base layer as a lower layer under relatively strong adhesion. It is hence difficult to unwind or peel off the wound tape or sheet for use as things are.

Therefore, the back surface of the base material has usually been subjected to so-called releasability-imparting treatment so as to permit easy unwinding of the pressure sensitive adhesive tape or sheet without undergoing the migration to the back surface of the base layer as the lower layer and blocking of the pressure sensitive adhesive, and the delamination of the base material upon its unwinding. As such a releasability-imparting treatment, it has been often used to date to apply a release agent to the back surface of a base material in advance.

It is however very difficult to give to the release agent contradictory properties such that it is caused to firmly adhere to the back surface of the base material, but made liable to suitably separate from the pressure sensitive adhesive layer. Therefore, it is necessary to use a special release agent, to coat the back surface of the base material with a primer, or subject it to a corona discharge treatment prior to the coating of a release agent.

As the release agent, may be used linear alkyl-containing polymer (for example, polyvinyl ester allyloarbamates, silicone polymers, perfluoro hydrocarbon polymers, etc). In the method making use of the release agent, however, the cost of materials becomes more expensive by the cost of the release agent, and the production cost is also increased because of the required complex coating process. Moreover, even after producing the rolled pressure sensitive adhesive tape or sheet, there is a problem in quality aspect that the release agent migrates to the pressure sensitive adhesive layer, thereby causing the reduction of its adhesive strength.

The rolled pressure sensitive adhesive tapes making use of the pressure sensitive adhesive compositions described in Japanese Patent Publication No. 13594/1983 and Japanese Patent Application Laid-Open No. 129085/1989 also involve the same problems as described above. For example, when the pressure sensitive adhesive composition according to Japanese Patent Publication No. 13594/1983 is applied by hot-melt coating on kraft paper to form a roll of a kraft-based pressure sensitive adhesive tape, it is necessary to laminate polyethylene on the side opposite to the side of the kraft paper, on which the pressure sensitive adhesive is coated, i.e., the back surface, in advance and then apply a release agent thereto.

OBJECT AND SUMMARY OF THE INVENTION

An object of the present invention is to provide a pressure sensitive adhesive composition, which can provide rolled pressure sensitive adhesive tapes by using it, said tapes exhibiting good removability, having good unwinding ability, i.e., rerolling ability even when making no use of any release agents, retaining good rerolling force and removability over a long period of time, and permitting the peeling with smaller peel adhesion at high-speed releasing such as releasing at a peel rate of 20–30 m/min upon practical use than at low-speed releasing.

Another object of this invention is to provide pressure sensitive adhesive tapes or sheets making use of the pressure sensitive adhesive composition.

The present inventors have carried out an extensive investigation with a view toward overcoming the problems involved in the above prior art. As a result, it has been found that the above-mentioned objects can be achieved by using a pressure sensitive adhesive composition comprising a block copolymer represented by the general formula A-B-A and/or a block copolymer represented by the general formula A-B, wherein A means a styrene polymer block and B denotes a butadiene polymer block, an isoprene polymer block or a polymer block obtained by hydrogenating these polymers, a tackifying resin and a polyolefin in specific proportions.

According to the present invention, there is thus provided a pressure sensitive adhesive composition comprising 100 parts by weight of at least one block copolymer selected from the group consisting of block copolymers represented by the general formula A-B-A and block copolymers represented by the general formula A-B, wherein A means a styrene polymer block and B denotes a butadiene polymer block, an isoprene polymer block or a polymer block obtained by hydrogenating these polymers, 10-200 parts by weight of a tackifying resin and 25-200 parts by weight of a polyolefin.

The pressure sensitive adhesive composition according to this invention may comprise further 0.01-5 parts by weight of polyethyleneimine in which a higher alkyl group has been introduced.

According to the present invention, there is also provided a pressure sensitive adhesive tape or sheet making use of the pressure sensitive adhesive composition as a pressure sensitive adhesive layer.

DETAILED DESCRIPTION OF THE INVENTION

Features of the present invention will hereinafter be described in detail.

No particular limitation is imposed of the base material for the pressure sensitive adhesive tape or sheet according to this invention. As exemplary base materials, may be mentioned kraft paper, fabric and thermoplastic resin films. When paper such as kraft paper is used as a base material, it is preferable to laminate a polyolefin film such as a polyethylene or polypropylene film on the side opposite to that to be coated with a pressure sensitive adhesive, i.e., the back surface, in advance.

A surface protective film is a pressure sensitive adhesive tape or sheet intended to use for temporarily applying it onto a surface of a synthetic resin board, decorative laminated sheet, metal plate or the like so as to protect the surface from the adhesion of dust and/or damage. As a base material for the surface protective film, may be used a film formed of a polyolefin such as polyethylene or polypropylene, or a mixture thereof. This film may be unstretched, uniaxially stretched or multiaxially stretched.

With the block copolymer represented by the general formula A-B-A or A-B, the block A is preferably a block of a styrene polymer having an average molecular weight of about 12,000-100,000 and a glass transition temperature of 20° C. or higher. The block B is preferably a block of a butadiene polymer, an isoprene polymer or a polymer obtained by hydrogenating these polymers, which has an average molecular weight of about 10,000-300,000 and a glass transition temperature of −20° C. or lower.

The weight ratio of the block A to the block B is preferably 5/95 to 50/50, more preferably 10/90 to 30/70. The block copolymers represented by the general formulae A-B-A and A-B may be used either singly or in combination in the form of a blend. When both copolymers are blended with each other, the weight ratio of A-B-A to A-B is generally 100/0 to 20/80, preferably 100/0 to 50/50.

As the tackifying resin, a resin selectively compatible with the block B component in the block copolymer represented by the general formula A-B-A or A-B is preferably used. As examples of such a tackifying resin, may be mentioned aliphatic hydrocarbon resins, terpenes, coumarone-indene resins, aromatic hydrocarbon resins, rosin resins, etc.

The proportion of the tackifying resin falls within a range of 10-200 parts by weight per 100 parts by weight of the block copolymer. Any proportions of the tackifying resin lower than 10 parts by weight result in insufficient tackiness. To the contrary, any proportions exceeding 200 parts by weight lead to lowered cohesive strength. The proportion of the tackifying resin is preferably 20-150 parts by weight, more preferably 30-100 parts by weight.

As exemplary polyolefins, may be mentioned low-density polyethylene, medium-density polyethylene, high-density polyethylene, linear low-density polyethylene, ethylene-α-olefin copolymers, ethylene-ethyl acrylate copolymers, ethylene-vinyl acetate copolymers, ethylene-methyl methacrylate copolymers, ethylene-n-butyl acrylate copolymers, (crystalline) polypropylene and mixtures thereof.

The polyolefins useful in the practice of this invention are those generally having a high molecular weight of about 0.1-30, preferably about 0.5-20, in terms of melt index (MI; g/10 min: ASTM D1238). Those of a low molecular weight or in the form of wax are eliminated.

The polyolefin used in this invention preferably contains less low-molecular weight products. Described specifically, the content of low-molecular weight products extracted in n pentane under reflux at a boiling point of n-pentane is preferably lower than 1.0 wt. %. When the content of the low-molecular weight products exceeds 1.0 wt. %, they adversely affect on the tackiness of the resultant pressure sensitive adhesive composition as temperature changes and time goes on, and its adhesive strength is hence lowered.

The proportion of the polyolefin falls within a range of 25-200 parts by weight per 100 parts by weight of the block copolymer. Any proportions of the polyolefin lower than 25 parts by weight make it difficult to stably provide good unwinding ability. To the contrary, any proportions exceeding 200 parts by weight lose the resulting pressure sensitive adhesive composition tackiness. The proportion of the polyolefin is preferably within a range of 30-180 parts by weight, more preferably 30-150 parts by weight.

The polyethyleneimine in which a higher alkyl group has been introduced is an optionally adding component which may be contained as necessary. As examples of this component, those having an average molecular weight of 1,000-20,000 are preferred. The higher alkyl group is preferably contained in a proportion of 0.5-1.0 equivalent to the imine group, with 0.7-1.0 equivalent being more preferred. In general, the higher alkyl group is preferably that having 12 or more carbon atoms, with an octadecyl group being particularly preferred. The introduction of the higher alkyl group into the polyethyleneimine is carried out, for example, by adding an excess amount of higher alkyl isocyanate to polyethyleneimine to conduct addition reaction.

The proportion of the higher alkyl-introduced polyethyleneimine is generally within a range of 0.01-5 parts by weight per 100 parts by weight of the block copolymer. Any proportions of the polyethyleneimine lower than 0.01 part by weight have little improving effect to suppress a rise in tackiness with time. When the proportion exceeds 5 parts by weight to the contrary, the polyethyleneimine greatly bleeds out on the surface of the pressure sensitive adhesive layer, so that its adherend is stained. The proportion of the higher alkyl-introduced polyethyleneimine is preferably within a range of 0.1-3 parts by weight, more preferably 0.5-2 parts by weight.

A liquid rubber may be incorporated in the pressure sensitive adhesive composition according to this invention as necessary. As exemplary liquid rubbers, may be mentioned polybutene, polyisobutylene and (liquid) polyisoprene. Preference is given to those having a weight average molecular weight of about 500-50,000. Liquid rubbers having no functional groups in their molecules are preferred. Any liquid rubbers having a double bond are not preferred because the resulting pressure sensitive adhesive composition is deteriorated in heat resistance.

The proportion of the liquid rubber is generally within a range of 5-100 parts by weight per 100 parts by weight of the block copolymer. Any proportions of the liquid rubber lower than 5 parts by weight have little effect to improve wettability. To the contrary, any proportions exceeding 100 parts by weight lose the resulting pressure sensitive adhesive composition cohesive strength.

The pressure sensitive adhesive composition according to this invention may be added with an antioxidant, an ultraviolet absorbent and stabilizer such as a light stabilizer as necessary. For example, an antioxidant, "Irganox 1010" (trade name, product of Ciba-Geigy AG) is effective for deterioration by heat.

No particular limitation is imposed on the production process of the pressure sensitive adhesive tape or sheet making use of the pressure sensitive adhesive composition according to this invention. The coating process, extruding and laminating process or co-extrusion process may suitably be used. When the base material is composed of a thermoplastic resin such as a polyolefin resin, the coextrusion process is preferably used. The thickness of each layer may be suitably preset as necessary for the end application intended. In general, the thicknesses of the base layer and the pressure sensitive adhesive layer are about 10-500 μm and about 5-100 μm, respectively.

The pressure sensitive adhesive tape or sheet making use of the pressure sensitive adhesive composition according to this invention is increased in storage elastic modulus at room temperature and lowered in wettability between the composition and the base material compared with those making use of any pressure sensitive adhesive composition free of the polyolefin according to this invention. Therefore, the adhesion of the composition to the back surface of the base material becomes weak, so that it is easy to unwind or reroll the resulting pressure sensitive adhesive tape or the like. The roll of the pressure sensitive adhesive tape or sheet according to this invention becomes smaller in peel strength at high-speed releasing than at low-speed releasing.

The pressure sensitive adhesive composition according to this invention is smaller in wettability with respect to the base material compared with the pressure sensitive adhesive composition obtained by adding an extender oil, low-molecular weight polyethylene, etc. to the block copolymer. The unwinding ability of a rolled pressure sensitive adhesive tape o sheet obtained by using it is therefore improved.

When the pressure sensitive adhesive composition of this invention contains the higher alkyl-introduced polyethyleneimine, the polyethyleneimine bleeds out to the desired degree on the surface of the pressure sensitive adhesive layer to moderately control the physicochemical affinity with its adherend. This is considered to suppress a rise in tackiness with time. This pressure sensitive adhesive composition is also good in melt extrudability and suitable for use in co-extrusion with a thermoplastic resin such as a polyolefin. When the pressure sensitive adhesive composition of this invention contains the liquid rubber, the surfaces of any adherends are scarcely stained compared with the case where an extender oil is added because the liquid rubber is polymeric.

ADVANTAGES OF THE INVENTION

The use of the pressure sensitive adhesive composition according to this invention can provide rolled pressure sensitive adhesive tapes or sheets, which exhibits good removability, has good unwinding ability, i.e., rerolling ability even when making no use of any release agents, retains good rerolling force and removability over a long period of time, and permits the peeling with smaller peel adhesion at high-speed releasing than at low-speed releasing.

The pressure sensitive adhesive composition containing the higher alkyl-introduced polyethyleneimine can suppress an immoderate rise in adhesive strength with time.

The pressure sensitive adhesive tapes or sheets according to this invention can be temporarily applied onto any adherends and are particularly suitable for use as surface protective films because they have stable adhesive strength even when time goes on, are easy to peel off at high speed, do not cause adhesive transfer on the surface of an adherend when peeled off from the adherend, and so on.

EMBODIMENTS OF THE INVENTION

The present invention will hereinafter be described more specifically by the following examples and comparative examples. Incidentally, all designations of "part" or "parts" which will appear in the following examples and comparative examples mean part or parts by weight.

The measuring methods of various physical properties are as follows:
(1) Adhesive strength:

A method according to JIS Z 0237-8 (peel rate: 300 mm/min). The adhesive strength is expressed in terms of the reduced value of g/25 mm wide to the force required to stick the pressure sensitive adhesive tape unwound from each roll on a stainless steel plate prescribed in JIS Z 0237 by a laminator, leave the laminate to stand for 30 minutes at 23° C. and then peel the adhesive tape from the steel plate at a rate of 300 mm/min, a peel angle of 180° and 23° C.
(2) Holding power:

A method according to JIS Z 0237-11. A test sample 25 mm wide and 150 mm long is cut out of each pressure sensitive adhesive tape. The test sample is stuck on a stainless steel plate in such a manner that a portion having an area of 25×25 mm comes into contact with the steel plate. Another portion out of contact is folded back with its inner surface inside. A roller is reciprocated once on the test sample at an application strength of 300 mm/min to bring the test sample into contact under pressure with the steel plate. After the lapse of at least 20 minutes, one end of the stainless steel plate is fastened by a claspe in such a manner that the test sample is hung perpendicularly. A weigh of 1,000 g is attached to an end of the folded portion to measure the time until the test sample falls from the stainless steel plate.

(3) Rerolling force:

A method according to JIS Z 0237-10. The rerolling force is expressed in terms of the reduced value of g/50 mm wide to the force required to set each rolled pressure sensitive adhesive tape on an unwinding tester and unwind the tape from the roll at a rate of 60 m/min.

Example 1

A composition composed of 100 parts of a styrene-butadiene-styrene block copolymer ("Califlex TR-1107", product of Shell Kagaku K. K.), 100 parts of a tackifying resin ("Escorez 4401", product of Tonex K. K.), 80 parts of low-density polyethylene ("Mirason 12", product of Mitsui Petrochemical Industries, Ltd.; MI=3.0) and 1 part of an antioxidant ("Yoshinox 425", product of Yoshitomi Pharmaceutical Industrial Co., Ltd.) was thoroughly mixed to feed it to a coater by a gear pump.

The above-obtained pressure sensitive adhesive composition was melted under heating and coated by the coater to a thickness of 40 μm on the side opposite to the polyethylene side of a base material, which had been obtained in advance by extruding polyethylene ("Mirason 16", product of Mitsui Petrochemical Industries, Ltd.) to a thickness of 16 μm on one side of kraft paper having a thickness of 90 μm to laminate them, thereby obtaining a pressure sensitive adhesive tape. The pressure sensitive adhesive tape thus obtained was wound up on a paper core having an internal diameter of 3 inches into a roll.

Example 2

A pressure sensitive adhesive tape was obtained in the same manner as in Example 1 except that a styrene-isoprene-styrene block copolymer ("Califlex TR-1102", product of Shell Kagaku K. K.) was used in place of the styrene-butadiene-styrene block copolymer.

Example 3

A pressure sensitive adhesive tape was obtained in the same manner as in Example 1 except that a composition composed of 100 parts of a hydrogenated styrene-isoprene-styrene block copolymer ("Septon 2063", product of Kuraray Co., Ltd.), 100 parts of a tackifying resin ("CLEARON P-115, product of Yasuhara Yushi Kogyo Co., Ltd.), 40 parts of linear low-density polyethylene ("UF 840", product of Mitsubishi Petrochemical Company, Limited; MI=1.5) and 1 part of an antioxidant ("Irganox 1010", product of Ciba Geigy AG) was used.

Example 4

A pressure sensitive adhesive tape was obtained in the same manner as in Example 1 except that a composition composed of 100 parts of a hydrogenated styrene-butadiene-styrene block copolymer ("Tufec H1052", product of Asahi Chemical Industry Co., Ltd.), 100 parts of a tackifying resin ("Arkon P-100, product of Arakawa Chemical Industries, Ltd.), 30 parts of low-density polyethylene ("Mirason 12", product of Mitsui Petrochemical Industries, Ltd.) and 1 part of an antioxidant ("Yoshinox 425", product of Yoshitomi Pharmaceutical Industrial Co., Ltd.) was used.

Example 5

A composition composed of 100 parts of a hydrogenated styrene-butadiene-styrene block copolymer ("Tufec H1052", product of Asahi Chemical Industry Co., Ltd.), 50 parts of a tackifying resin ("Arkon P-100", product of Arakawa Chemical Industries, Ltd.), 30 parts of low-density polyethylene ("Mirason 12", product of Mitsui Petrochemical Industries, Ltd.) and 1 part of an antioxidant ("Yoshinox 425", product of Yoshitomi Pharmaceutical Industrial Co., Ltd.), and low-density polyethylene ("Mirason 12", product of Mitsui Petrochemical Industries, Ltd.) were extruded by a coextrusion technique to thicknesses of 15 μm and 100 μm, respectively, thereby obtaining a pressure sensitive adhesive tape.

Example 6

A pressure sensitive adhesive tape was obtained in the same manner as in Example 1 except that 1 part of higher alkyl-introduced polyethyleneimine [an octadecyl group being introduced in a proportion of 0.9 equivalent to the imine group of polyethyleneimine (average molecular weight: 2,000)] was added further to the pressure sensitive adhesive composition in Example 1.

Example 7

A pressure sensitive adhesive tape was obtained in the same manner as in Example 2 except that 1 part of the same higher alkyl-introduced polyethyleneimine as that employed in Example 6 was added further to the pressure sensitive adhesive composition in Example 2.

Example 8:

A pressure sensitive adhesive tape was obtained in the same manner as in Example 3 except that 1 part of the same higher alkyl-introduced polyethyleneimine as that employed in Example 6 was added further to the pressure sensitive adhesive composition in Example 3.

Example 9

A pressure sensitive adhesive tape was obtained in the same manner as in Example 4 except that 1 part of the same higher alkyl-introduced polyethyleneimine a that employed in Example 6 was added further to the pressure sensitive adhesive composition in Example 4.

Example 10

A pressure sensitive adhesive tape was obtained in the same manner as in Example 5 except that 1 part of the same higher alkyl-introduced polyethyleneimine as that employed in Example 6 was added further to the pressure sensitive adhesive composition in Example 5.

Example 11

A composition composed of 100 parts of a hydrogenated styrene-butadiene-styrene block copolymer ("Kraton G1657", product of Shell Kagaku K. K.), 30 parts of a tackifying resin ("Escorez 5300", product of Tonex K. K.), 100 parts of low-density polyethylene ("Mirason 16", product of Mitsui Petrochemical Industries, Ltd.; MI=3.7), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 326", product of Ciba-Geigy AG), and low-density polyethylene ("Mirason 16", product of Mitsui Petrochemical Industries, Ltd.) were extruded by a two-layer co-extrusion technique to thicknesses of 8 μm and 50 μm, respectively, thereby obtaining a surface protective film.

Example 12

A surface protective film was obtained in the same manner as in Example 11 except that a composition composed of 100 parts of a hydrogenated styrene-butadiene-styrene block copolymer ("Kraton G1657", product of Shell Kagaku K. K.), 40 parts of a tackifying resin ("Escorez 5300", product of Tonex K. K.), 70 parts of low-density polyethylene ("Mirason 16", product of Mitsui Petrochemical Industries, Ltd.), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 326", product of Ciba-Geigy AG) was used.

Example 13

A surface protective film was obtained in the same manner as in Example 11 except that a composition composed of 100 parts of a hydrogenated styrene-isoprene-styrene block copolymer ("Septon 2063", product of Kuraray Co., Ltd.), 20 parts of a tackifying resin ("CLEARON P-125", product of Yasuhara Yushi Kogyo Co., Ltd.), 120 parts of low-density polyethylene ("Mirason 16", product of Mitsui Petrochemical Industries, Ltd.), 2 parts of the same higher alkyl-introduced polyethyleneimine as that employed in Example 6, 1 part of an antioxidant ("Irganox 1010", product of Ciba-Geigy AG), 0.5 part of a ultraviolet absorbent ("Tinuvin 326", product of Ciba-Geigy AG) and 0.5 part of a light stabilizer ("LA-63", product of Asahi Denka Co., Ltd.) was used.

Example 14

A composition composed of 100 parts of a hydrogenated styrene-butadiene-styrene block copolymer ("Kraton G1657", product of Shell Kagaku K. K.), 50 parts of a tackifying resin ("Escorez 5300", product of Tonex K. K.), 50 parts of medium-density polyethylene ("Neozex 3510F", product of Mitsui Petrochemical Industries, Ltd.; MI=1.6), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 326", product of Ciba-Geigy AG), and polypropylene ("Noblen EFL664", product of MitsuiToatsu Chemicals, Inc.) were extruded by a two-layer coextrusion technique to thicknesses of 8 μm and 50 μm, respectively, thereby obtaining a surface protective film.

Example 15

A surface protective film was obtained in the same manner as in Example 14 except that linear low-density polyethylene ("UF 840", product of Mitsubishi Petrochemical Company, Limited) was used in place of polypropylene.

Example 16

A surface protective film was obtained in the same manner as in Example 14 except that high-density polyethylene ("HY 430", product of Mitsubishi Petrochemical Company, Limited; MI=0.8) was used in place of polypropylene.

Example 17

A surface protective film was obtained in the same manner as in Example 14 except that a mixture of 100 parts of high-density polyethylene ("HY 430", product of Mitsubishi Petrochemical Company, Limited) and 100 parts of low-density polyethylene ("LK 30", product of Mitsubishi Petrochemical Company, Limited; MI=4.0) was used in place of polypropylene.

Example 18

A composition composed of 100 parts of a hydrogenated styrene-butadiene-styrene block copolymer ("Kraton G1657", product of Shell Kagaku K. K.), 50 parts of a tackifying resin ("Escorez 5300", product of Tonex K.K.), 100 parts of low-density polyethylene ("Mirason 16", product of Mitsui Petrochemical Industries, Ltd.), 2 parts of the same higher alkyl-introduced polyethyleneimine as that employed in Example 6, 20 parts of polybutene ("Idemitsu Polybutene 300H", molecular weight: 1,500, product of Idemitsu Petrochemical Co., Ltd.), 1 part of an antioxidant ("Irganox 1010", product of Ciba-Geigy AG) and 0.5 part of a ultraviolet absorbent ("Tinuvin 327", product of Ciba-Geigy AG), and low-density polyethylene ("Mirason 12", product of Mitsui Petrochemical Industries, Ltd.) were extruded by a two-layer co-extrusion technique to thicknesses of 10 μm and 50 μm, respectively, thereby obtaining a surface protective film.

Example 19

A surface protective film was obtained in the same manner as in Example 18 except that a composition composed of 100 parts of a hydrogenated styrene-butadiene-styrene block copolymer ("Kraton G1657", product of Shell Kagaku K. K.), 40 parts of a tackifying resin ("Escorez 5300", product of Tonex K. K.), 70 parts of low-density polyethylene ("Mirason 16", product of Mitsui Petrochemical Industries, Ltd.), 2 parts of the same higher alkyl-introduced polyethyleneimine as that employed in Example 6, 50 parts of liquid polyisoprene ("Kuraprene LIR-290", molecular weight: 25,000, product of Kuraray Co., Ltd.), 1 part of an antioxidant ("Irganox 1010", product of Ciba-Geigy AG) and 0.5 part of a ultraviolet absorbent ("Tinuvin 327", product of Ciba-Geigy AG) was used.

Example 20

A surface protective film was obtained in the same manner as in Example 18 except that a composition composed of 100 parts of a hydrogenated styrene-isoprene-styrene block copolymer ("Septon 2063", product of Kuraray Co., Ltd.), 20 parts of a tackifying resin ("CLEARON P-125", product of Yasuhara Yushi Kogyo Co., Ltd.), 120 parts of low-density polyethylene ("Mirason 16", product of Mitsui Petrochemical Industries, Ltd.), 2 parts of the same higher alkyl-introduced polyethyleneimine as that employed in Example 6, 40 parts of liquid polyisoprene ("Kuraprene LIR-30", molecular weight: 29,000, product of Kuraray Co., Ltd.), 1 part of an antioxidant ("Irganox 1010", product of Ciba-Geigy AG), 0.5 part of a ultraviolet absorbent ("Tinuvin 327", product of Ciba-Geigy AG) and 0.5 part of a light stabilizer ("LA-63", product of Asahi Denka Co., Ltd.) was used.

Comparative Example 1

A pressure sensitive adhesive tape was obtained in the same manner as in Example 1 except that 50 parts of naphthene oil ("Sunsen Oil", product of SUNOCO COMPANY) was used instead of low-density polyethylene.

Comparative Example 2

A pressure sensitive adhesive tape was obtained in the same manner as in Example 2 except that 50 parts of naphthene oil ("Sunsen Oil", product of SUNOCO COMPANY) was used instead of low-density polyethylene.

Comparative Example 3

A pressure sensitive adhesive tape was obtained in the same manner as in Example 1 except that 1 part of the same higher alkyl-introduced polyethyleneimine a that employed in Example 6 was added further to the pressure sensitive adhesive composition in Comparative Example 2.

Comparative Example 4

A composition composed of 100 parts of a hydrogenated styrene-butadiene-styrene block copolymer ("Kraton G1657", product of Shell Kagaku K. K.), 20 parts of a tackifying resin ("Escorez 5300", product of Tonex K. K.), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 326", product of Ciba-Geigy AG), and low-density polyethylene ("Mirason 16", product of Mitsui Petrochemical Industries, Ltd.) were extruded by a co-extrusion technique to thicknesses of 8 μm and 50 μm, respectively, thereby obtaining a surface protective film.

Comparative Example 5

A surface protective tape was obtained in the same manner as in Comparative Example 4 except that the amount of the tackifying resin ("Escorez 5300", product of Tonex K. K.) was changed to 50 parts.

Comparative Example 6

A composition composed of 100 parts of a hydrogenated styrene-butadiene-styrene block copolymer ("Kraton G1657", product of Shell Kagaku K. K.), 20 parts of a tackifying resin ("Escorez 5300", product of Tonex K. K.), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 327", product of Ciba-Geigy AG), and low-density polyethylene ("Mirason 16", product of Mitsui Petrochemical Industries, Ltd.) were extruded by a co-extrusion technique to thicknesses of 8 μm and 50 μm, respectively, thereby obtaining a surface protective film.

Comparative Example 7

A surface protective tape was obtained in the same manner as in Comparative Example 6 except that a composition composed of 100 parts of a hydrogenated styrene-isoprene-styrene block copolymer ("Septon 2063", product of Kuraray Co., Ltd.), 30 parts of a tackifying resin ("CLEARON P-125", product of Yasuhara Yushi Kogyo Co., Ltd.), 2 parts of the same higher alkyl-introduced polyethyleneimine as that employed in Example 6, 1 part of an antioxidant ("Irganox 1010", product of Ciba-Geigy AG) and 0.5 part of a ultraviolet absorbent ("Tinuvin 327", product of Ciba-Geigy AG) was used.

TABLE 1

| | Adhesive strength (g/25 mm) | | | | Holding power (min) | Rerolling force (g/50 mm) | |
| --- | --- | --- | --- | --- | --- | --- | --- |
| | 30 Min. at 20° C. | 3 Days at 40° C. | 7 Days at 60° C. | 30 Days at 60° C. | | Just after prod. | 30 Days at 40° C. |
| Ex. 1 | 980 | 2210 | — | — | 1440< | — | 200 |
| Ex. 2 | 790 | 2450 | — | — | 1440< | — | 230 |
| Ex. 3 | 920 | — | — | — | 1440< | — | 160 |
| Ex. 4 | 890 | — | — | — | 1440< | — | 120 |
| Ex. 5 | 480 | — | — | — | 1440< | — | 230 |
| Ex. 6 | 900 | 730 | — | — | 1440< | — | 200 |
| Ex. 7 | 750 | 640 | — | — | 1440< | — | 230 |
| Ex. 8 | 880 | 600 | — | — | 1440< | — | 160 |
| Ex. 9 | 840 | 600 | — | — | 1440< | — | 120 |
| Ex. 10 | 450 | 310 | — | — | 1440< | — | 230 |
| Ex. 11 | 100 | — | 70 | 85 | — | 20 | 120 |
| Ex. 12 | 190 | — | 130 | 165 | — | 40 | 120 |
| Ex. 13 | 70 | — | 40 | 55 | — | 20 | 120 |
| Ex. 14 | 220 | — | 200 | 220 | — | 30 | 120 |
| Ex. 15 | 250 | — | 200 | 230 | — | 30 | 120 |
| Ex. 16 | 280 | — | 220 | 250 | — | 30 | 120 |
| Ex. 17 | 180 | — | 150 | 170 | — | 30 | 120 |
| Ex. 18 | 160 | — | 110 | 100 | — | 80 | 150 |
| Ex. 19 | 250 | — | 220 | 220 | — | 120 | 250 |
| Ex. 20 | 340 | — | 300 | 300 | — | 120 | 250 |
| Comp. Ex. 1 | 1500 | 2400 | — | — | 1440< | — | * |
| Comp. Ex. 2 | 2700 | 2000 | — | — | 1440< | — | * |
| Comp. Ex. 3 | 1500 | 1030 | — | — | 1440< | — | * |
| Comp. Ex. 4 | 200 | — | 145 | 150 | — | 400 | * |

TABLE 1-continued

|  | Adhesive strength (g/25 mm) | | | | Holding power (min) | Rerolling force (g/50 mm) | |
| --- | --- | --- | --- | --- | --- | --- | --- |
|  | 30 Min. at 20° C. | 3 Days at 40° C. | 7 Days at 60° C. | 30 Days at 60° C. |  | Just after prod. | 30 Days at 40° C. |
| Comp. Ex. 5 | 670 | — | 510 | 600 | — | 670 | * |
| Comp. Ex. 6 | 200 | — | 145 | 150 | — | 400 | * |
| Comp. Ex. 7 | 570 | — | 510 | 500 | — | 620 | * |

*Impossible peeling.

It is appreciated from Table 1 that the rolled pressure sensitive adhesive tapes or surface protective films according to Examples 1–20 are not broken upon peeling them from the rolls and have moderate rerolling force and initial adhesive strength. On the other hand, it is understood that the pressure sensitive adhesive tapes or the surface protective films according to Comparative Examples 4–7 have rerolling force at least ten times that of the surface protective films obtained in Examples 11–17 even right after their production. The rolled pressure sensitive adhesive tapes or surface protective films obtained in Comparative Examples 1–7 are too high in rerolling force to peel off them from their rolls after time has gone on. The pressure sensitive adhesive tapes or surface protective films obtained in Examples 6–20 are completely prevented from immoderately rising in tackiness with time.

With respect to the surface protective films obtained in Examples 11 and 12 and Comparative Example 4, the adhesive strength after aged for 30 days under a pressure of 50 tons/m² at 30° C. was measured at both peel rates of low speed (300 mm/min) and high speed (30 m/min). The results of the measurement are shown collectively in Table 2.

TABLE 2

|  | Adhesive strength (g/25 mm) | |
| --- | --- | --- |
|  | Peel rate of 300 mm/min | Peel rate of 30 m/min |
| Example 11 | 300 | 90 |
| Example 12 | 400 | 150 |
| Comparative Example 4 | 250 | 400 |

It is appreciated from Table 2 that the adhesive strengths of the rolls obtained in Examples 11 and 12 are somewhat high at the low speed, but become moderate at the high speed, and to the contrary, the adhesive strength of the roll obtained in Comparative Example 4 is moderate at the low speed, but becomes higher at the high speed.

Upon putting a pressure sensitive adhesive tape or surface protective film to practical use, it is released from its adherend at a high speed (20–30 m/min). The pressure sensitive adhesive tapes or sheets according to this invention therefore exhibit desirable properties for surface protective films that they are hard to peel upon the processing, storage or shipment of their adherends and easy to peel upon releasing after use.

Example 21

A composition composed of 100 parts of a hydrogenated styrene-butadiene-styrene block copolymer ("Kraton G1657", product of Shell Kagaku K. K.), 100 parts of a tackifying resin ("Arkon P-100", product of Arakawa Chemical Industries, Ltd.), 80 parts of low-density polyethylene (a product obtained by washing "LK-30" produced by Mitsubishi Petrochemical Company, Limited with boiled n-hexane to remove low-molecular weight products therefrom, thereby controlling the amount of the low-molecular weight products extracted in n-pentane to 0.8 wt. %) and 1 part of an antioxidant ("Irganox 1010", product of Ciba-Geigy AG), and low-density polyethylene ("Mirason 16", product of Mitsui Petrochemical Industries, Ltd.) were extruded by a T-die two-layer co-extrusion technique to thicknesses of 20 μm and 60 μm, respectively, thereby obtaining a surface protective film.

Example 22

A surface protective film was obtained in the same manner as in Example 21 except that a styrene-butadiene block copolymer ("Tufprene A", product of Asahi Chemical Industry Co., Ltd.) was used instead of the hydrogenated styrene-butadiene-styrene block copolymer.

Example 23

A surface protective film was obtained in the same manner as in Example 21 except that a styrene-isoprene block copolymer ("Califlex TR1102" product of Asahi Chemical Industry Co., Ltd.) was used instead of the hydrogenated styrene-butadiene-styrene block copolymer.

Example 24

A surface protective film was obtained in the same manner as in Example 21 except that 30 parts of an ethylene-α-olefin copolymer (a product obtained by washing "Tafmer A-4085" [MI=3.6] produced by Mitsui Petrochemical Industries, Ltd. with boiled n-hexane to remove low-molecular weight products therefrom, thereby controlling the amount of the low-molecular weight products extracted in n-pentane to 0.5 wt. %) was used instead of the low-density polyethylene.

Comparative Example 8

A surface protective film was obtained in the same manner as in Example 21 except that the polyolefin was not incorporated in the pressure sensitive adhesive composition.

Comparative Example 9

A surface protective film was obtained in the same manner as in Example 22 except that the polyolefin was not incorporated in the presence sensitive adhesive composition.

With respect to the surface protective films obtained in Examples 11-24 and Comparative Examples 8-9, the unwinding force (rerolling force) right after wound up into rolls, the adhesive strength after left over for 12 hours at room temperature (23° C.) after their production and the adhesive strength after left over for 7 days at 40° C. after their production were measured. The results of these measurements are shown collectively in Table 3.

TABLE 3

|  | Adhesive strength (g/25 mm) | | Rerolling force (g/50 mm) |
| --- | --- | --- | --- |
|  | 12 Hours at 23° C. | 7 Days at 40° C. |  |
| Example 21 | 400 | 390 | 180 |
| Example 22 | 380 | 380 | 230 |
| Example 23 | 350 | 360 | 230 |
| Example 24 | 760 | 740 | 250 |
| Comparative Example 8 | 890 | 830 | Impossible peeling |
| Comparative Example 9 | 860 | 790 | Impossible peeling |

The surface protective films in Examples 21-24 are those obtained by using the polyolefin in which the content of low-molecular weight products extracted in n-pentane is less than 1.0 wt. %. The same measurements as described above were conducted on surface protective films obtained by using a polyolefin in which the content of low-molecular weight products extracted in n-pentane exceeds 1.0 wt. %, for example, (a) a surface protective film obtained in the same manner as in Example 21 except that low-density polyethylene free from washing with boiled n-hexane ("LK-30", product of Mitsubishi Petrochemical Company, Limited; extraction in n-pentane: 2.1 wt. %) was used, (b) a surface protective film obtained in the same manner as in Example 22 except that low-density polyethylene free from washing with boiled n-hexane ("LK-30", product of Mitsubishi Petrochemical Company, Limited; extraction in n-pentane: 2.1 wt. %) was used, (c) a surface protective film obtained in the same manner as in Example 23 except that low-density polyethylene free from washing with boiled n-hexane ("LK-30", product of Mitsubishi Petrochemical Company, Limited; extraction in n-pentane: 2.1 wt. %) was used, and (d) a surface protective film obtained in the same manner as in Example 24 except that an ethylene-α-olefin copolymer ("Tafmer A-4085", product of Mitsui Petrochemical Industries, Ltd.; extraction in n-pentane: 1.5 wt. %) was used. As a result, it was found that their adhesive strengths (g/25 mm) are 390 for (a), 350 for (b), 340 for (c) and 720 for (d) after left over for 12 hours at 23° C., but lowered to 95, 80, 65, 120, respectively, after the lapse of 7 days at 40° C. It is therefore understood from this that polyolefins in which the content of low-molecular weight products extracted in n-pentane is less than 1.0 wt. % are preferred.

What is claimed is:

1. A pressure sensitive adhesive composition consisting essentially of 100 parts by weight of at least one block copolymer selected from the group consisting of block polymers represented by the general formula A-B-A and block copolymers represented by the general formula A-B, wherein A denotes a styrene polymer block and B denotes a butadiene polymer block, an isoprene polymer block, a polymer block obtained by hydrogenating a butadiene polymer block, or a polymer block obtained by hydrogenating an isoprene block, 10-200 parts by weight of a tackifying resin and 25-200 parts by weight of a polyolefin having a melt index of about 0.1-30 g/10 min, wherein the polyolefin contains products which can be extracted in n-pentane in an amount less than 1.0 wt. %.

2. A pressure sensitive adhesive composition according to claim 1, which further comprises 0.01-5 parts by weight of polyethylene-imine containing an alkyl group of at least 12 carbon atoms.

3. A pressure sensitive adhesive composition according to claim 1, which further comprises 5-100 parts by weight of a liquid rubber.

4. A pressure sensitive adhesive composition according to claim 1, wherein the polyolefin is low-density polyethylene, medium-density polyethylene, high-density polyethylene or an ethylene-60-olefin copolymer.

5. A pressure sensitive adhesive composition according to claim 1, wherein the block copolymer is a nonhydrogenated styrene-butadiene-styrene block copolymer, a nonhydrogenated styrene-isoprene-styrene block copolymer, a hydrogenated styrene-butadiene-styrene block copolymer or a hydrogenated styrene-isoprene-styrene block copolymer.

6. A pressure sensitive adhesive composition according to claim 4, wherein the polyolefin is linear low-density polyethylene.

* * * * *